(12) United States Patent
Sonobe

(10) Patent No.: US 7,447,567 B2
(45) Date of Patent: Nov. 4, 2008

(54) ELECTRIC POWER SYSTEM SUPPRESSING CORONA DISCHARGE FROM VIEWPOINT OF ENVIRONMENT

(75) Inventor: Takeo Sonobe, 13-7 Nishinodai, Tsukubamirai-shi, Ibaraki (JP) 300-2442

(73) Assignee: Takeo Sonobe, Ibaraki (JP)

( * ) Notice: Subject to any disclaimer, the term of this patent is extended or adjusted under 35 U.S.C. 154(b) by 139 days.

(21) Appl. No.: 10/578,604

(22) PCT Filed: Oct. 29, 2004

(86) PCT No.: PCT/JP2004/016153

§ 371 (c)(1),
(2), (4) Date: May 4, 2006

(87) PCT Pub. No.: WO2005/043708

PCT Pub. Date: May 12, 2005

(65) Prior Publication Data

US 2007/0144766 A1    Jun. 28, 2007

(30) Foreign Application Priority Data

Nov. 4, 2003   (JP)  .............................. 2003-373850

(51) Int. Cl.
*G05D 3/12* (2006.01)
(52) U.S. Cl. ....................... 700/293; 700/286; 700/294; 427/460

(58) Field of Classification Search ................. 700/284, 700/286, 291–298; 427/460, 533, 535, 562, 427/569, 906; 264/423, 455, 469, 483; 174/127; 250/324, 423; 324/512, 536; 361/230, 275.1; 702/3

See application file for complete search history.

(56) References Cited

U.S. PATENT DOCUMENTS 3,806,626 A * 4/1974 Liao .......................... 174/40 R (Continued)

FOREIGN PATENT DOCUMENTS

JP    10-038957    2/1998

(Continued)

OTHER PUBLICATIONS

"Electrical Engineering Handbook", 2001, pp. 485-486, 1005-1023, 1225-1226, 6th Edition, The Institute of Electrical Engineers of Japan, Japan (with English Abstract).

(Continued)

*Primary Examiner*—Paul L Rodriguez
*Assistant Examiner*—Carlos Ortiz Rodriguez
(74) *Attorney, Agent, or Firm*—Cermak Kenealy & Vaidya LLP; Tomoko Nakajima

(57) ABSTRACT

The present invention provides an electric power system for stably supplying power while suppressing corona discharge generating ultraviolet radiation which may cause health problems in human beings. The corona discharge start voltage varies with the weather. Data on weather forecasts is inputted for each district at certain times so as to calculate the corona discharge estimated start voltage for each transmission line with a computer. If the calculation result predicts start of corona discharge at normal transmission voltage, the transmission voltage of the line is lowered or power transmission through the transmission line is stopped.

9 Claims, 8 Drawing Sheets

U.S. PATENT DOCUMENTS

| | | | |
|---|---|---|---|
| 4,057,736 A | | 11/1977 | Jeppson |
| 4,775,839 A | * | 10/1988 | Kosina et al. ............... 324/536 |
| 5,006,846 A | * | 4/1991 | Granville et al. ....... 340/870.28 |
| 5,181,026 A | | 1/1993 | Granville |
| 5,513,002 A | * | 4/1996 | Shapanus et al. ............ 356/313 |
| 5,568,385 A | * | 10/1996 | Shelton ......................... 702/3 |
| 6,104,297 A | * | 8/2000 | Danilychev ................. 340/600 |
| 6,476,396 B1 | * | 11/2002 | Forsyth ...................... 250/372 |
| 6,552,150 B1 | * | 4/2003 | Nummila-Pakarinen et al. ........................... 526/352 |
| 6,609,062 B2 | * | 8/2003 | Hancock ..................... 701/200 |
| 6,822,457 B2 | * | 11/2004 | Borchert et al. ............. 324/512 |
| 6,823,263 B1 | * | 11/2004 | Kelly et al. .................... 702/3 |
| 7,157,710 B1 | * | 1/2007 | Shannon ............... 250/339.05 |
| 7,275,089 B1 | * | 9/2007 | Marshall et al. ............. 709/219 |
| 2002/0116139 A1 | | 8/2002 | Przydatek et al. |

FOREIGN PATENT DOCUMENTS

| | | |
|---|---|---|
| JP | 11-038078 | 2/1999 |
| JP | 2004-127857 | 4/2004 |

OTHER PUBLICATIONS

"Ionized Gas", Electrical Engineering Handbook, Discussion pp. 28-51, 103-114, The Institute of Electrical Engineers of Japan, Japan (with English Abstract) 2001.

"Electromagnetic Fields And Public Health: Extremely Low Frequency Fields And Cancer", Oct. 2001, Fact sheet N 263, World Health Organization (WHO).

"Electromagnetic Fields And Public Health: Extremely Low Frequency (ELF)", Nov. 1998, Fact sheet N 205, World Health Organization (WHO).

"Protecting Children From Ultraviolet Radiation", Jul. 2001, Fact sheet N 261, World Health Organization (WHO).

Kabuto, M., "Epidemiologic Study On Childhood Cancers In Japan", 1999-2002, The National Institute for Environmental Studies (NIES), Japan (with English Abstract).

Ooya, T., et al., CRIEPI Review No. 47 p. 56, Central Research Institute of Electric Power Industry, Japan 2002 (with English Abstract).

Fukushima, M., "A Study On Audible Noise From AC And DC Transmission Lines" (Synopsis) Central Research Institute of Electric Power Industry, Komae Research Laboratory, Rep. T series 2001, Japan.

Sasano, T., et al., "Corona Effects of UHV AC Overhead Transmission Lines", (Synopsis) p. 32, Central Research Institute of Electric Power Industry, Komae Research Laboratory, Rep. T Series 2004, Japan.

Tanuma, S., Molecular Biology, Apr. 1999, p. 81, Maruzen Ltd., Japan (with English Abstract).

Satoh, K., et al., "Decomposition Characteristics Of Benzene In Flue Gas By Corona Discharge Plasma", vol. 53, Aug. 2003, Muroran Institute of Technology, Japan.

J-Y. Roncin and F. Launay, "Tables Of Vacuum Ultraviolet Emission Band Systems Of Molecular Nitrogen From 82.6 to 124.2nm" A&A Supplement series, vol. 128, Mar. 1, 1998, pp. 361-362.

F.G. Celii, et al., "Use of Spectrograph-based OES for SiN Etch Selectivity And Endpoint Optimization", 2001, Texas Instruments.

Health Guidance Manual Against Ultraviolet Light, Apr. 2004, Japan Ministry of The Environment home page (with English Abstract).

Masamitu, I., "Children, Skin And Sun", DHC Shuppan, 1996, pp. 18-49 (with English Abstract).

Ryer, Alex, "Light Measurement Handbook", 1997, http://www.intl-light.com.

P.W. Atkins, "Physical Chemistry", 6th Edition, 1998, pp. 248-249, 512, Oxford University Press.

Billinton, R., et al., "Reliability assessment of transistion and distribution systems considering repair in adverse weather conditions," IEEE CCECE2002. Canadian Conference on Electrical and Computer engineering. Conference Proceedings. vol. 1, May 2002, pp. 88-93, Winnipeg, Man., Canada.

* cited by examiner

Fig.3

| area | a | b | c | ... |
|---|---|---|---|---|
| Temperature (C) | 17 | 21 | 20 | ... |
| Pressure (hP) | 1006 | 1020 | 1002 | ... |
| Weather | Rain | Fine | Drizzle | ... |

Fig. 4

| Transmission Line | H1 | ... | Hk | C1 | ... | Cj | D1 | ... | Dh |
|---|---|---|---|---|---|---|---|---|---|
| Object for which corona discharge is to be suppressed | Y | ... | N | Y | ... | Y | Y | ... | N |
| Use past data | N | ... | — | N | ... | Y | N | ... | — |
| Past data (KV) | — | ... | — | — | ... | Rain 185 | — | ... | — |
| Normal transmission Voltage (KV) | 500 | ... | 275 | 220 | ... | 220 | 154 | ... | 22 |
| Area where set up | ab | ... | i | h | ... | k | l | ... | n |
| $m_0 * k$ | 0.96 | ... | — | 0.80 | ... | — | 0.68 | ... | — |
| Measures voltage 1 (KV) | 480 | ... | — | 190 | ... | 180 | 100 | ... | — |
| Measures voltage 2 (KV) | 450 | ... | — | 170 | ... | 170 | 90 | ... | — |

Fig. 5

| Transmission Line | H1 | ... | Hk | C1 | ... | Cj | D1 | ... | Dh |
|---|---|---|---|---|---|---|---|---|---|
| Set transmission voltage (KV) | 480 | ... | 275 | 190 | ... | 180 | 100 | ... | 22 |

US 7,447,567 B2

ELECTRIC POWER SYSTEM SUPPRESSING CORONA DISCHARGE FROM VIEWPOINT OF ENVIRONMENT

CROSS REFERENCE TO RELATED APPLICATIONS or PRIORITY CLAIM

This application is a national phase of International Application No. PCT/JP2004/016153 entitled "Electric Power System Suppressing Corona Discharge From Viewpoint of Environment", which was filed on Oct. 29, 2004, which was not published in English, and which claims priority of the Japanese Patent Application No. 2003-373850 filed Nov. 4, 2003.

TECHNICAL FIELD

The present invention relates to an electric power system, and to an operating method therefor for stably supplying power while suppressing corona discharge which generates ultraviolet radiation which may cause health problems in humans. Objects are to provide an electric power system, a computer program product for the electric power system, a computer readable medium in which the computer program is recorded, a server in which the computer program is installed, and an operating method therefor.

BACKGROUND ART

FIG. 8 shows a basic diagram of a large electric power system. As shown in FIG. 8, the large electric power system comprises basically electric power generation, transmission of the electric power, and distribution of the electric power. In other words, the electric power system comprises distribution electric power systems in which the main elements are power plants (generating stations), transmission lines, substations, distribution lines, etc., and corresponding control systems, that maintains normal operating conditions, in which the main elements are communication devices, protection devices, and control devices.

As shown in FIG. 8, an electric power system comprises power plants (generating stations) G1, G2 . . . Gn, electric power transmission lines H1, H2 . . . Hk, substations T1, T2 . . . Tm, interconnected transmission lines C1, C2 . . . Cj, distribution lines D1, D2 . . . Dh, distribution substations U1, U2 . . . Ua. The power plants (generating stations) G1, G2 . . . Gn are nuclear power stations, hydropower plants, thermal power generation plants, etc. These plants are constructed far from large cities that use large amounts of electric power, due to difficulties in finding cost-effective sites near large cities.

The generated electric power is transformed to higher voltages (500 KV, 275 KV, 220 KV, 187 KV, etc.) to decrease transmission loss, and is transmitted to the outskirts of large cities by the electric power transmission lines H1, H2 . . . Hk. The transmitted electric power is sent by the substations T1, T2 . . . Tm and the interconnected transmission lines C1, C2 . . . Cj. It is for the purpose of isolating imbalances in electric power consumption between districts, to integrate electric power generated by many kinds of electric power resources, to supply stable and economic electric power to the consumer.

The unified electric power is transformed to a lower voltage (154 KV to 22 KV), distributed to the distribution substations U1, U2 . . . Ua by the distribution lines D1, D2 . . . Dh and supplied to customers.

Electric power systems have been researched for a long time, and stable electric power can therefore be supplied to customers. Electric power is now a crucial base for industrial societies.

The corona discharge that appears when electric power is transmitted at high voltage has been researched, and it was found that the corona discharge may not appear, under common weather conditions, around the transmission and distribution lines.

However, research on the corona discharge on the fields of electric power systems are mainly directed to corona loss, corona noise, and apparatus damage from corona discharge. There is rarely research about corona discharge influences on the human body.

In 1979, Wertheimer and Leeper reported an association between childhood leukemia and certain features of the wiring connecting their homes to the electrical distribution lines. Since then, a large number of studies have been conducted to follow up this important result. Analysis of these papers by the US National Academy of Sciences in 1996 suggested that residence near power lines was associated with an elevated risk of childhood leukemia.

The opinion that the cause of the phenomenon was exposure to electric and magnetic fields at extremely low frequencies (less than 300 HZ, EML) became mainstream without notice. Therefore, the discussion about the phenomenon was limited to only whether the cause elevated risk of childhood leukemia was EML (like in witch-hunts in the Middle Ages in Europe).

In 1996, the World Health Organization (WHO) established the International Electromagnetic Fields (EMF) Project to address health issues regarding exposure to EMF. The EMF Project is currently reviewing research results and conducting risk assessment of exposure to static and extremely low frequency (ELF) electric and magnetic fields.

The International Agency for Research on Cancer (IARC), a specialized cancer research agency of the WHO, concluded the first step in the WHO health risk assessment process by classifying ELF fields with respect to the strength-of-the-evidence that they could cause cancer in humans on June 2001. WHO Fact sheet No. 263 reported "Two recent pooled analyses of epidemiological studies provide insight into the epidemiological evidence that played a pivotal role in the IARC evaluation. These studies suggest that, in a population exposed to average magnetic fields in excess of 0.3 to 0.4 µT, twice as many children might develop leukemia compared to a population with lower exposures." They also reported that "In spite of the large number of data base, some uncertainty remains as to whether magnetic field exposure or some other factor(s) might have accounted for the increased leukemia incidence."

The first and largest epidemiological research was conducted to investigate the possible risk factors for child leukemia and brain tumors, the major childhood cancers, in Japan.

The research was conducted by the National Institute for Environmental Studies (NIES) supported by the Japanese Ministry of Education, Culture, Sports, Science and Technology. The final report of the research was published in July 2003.

According to the report, the first cases of acute lymphoid leukemia (ALL) and acute myeloid leukemia (AML), which are major cases of childhood leukemia, were investigated.

The report states as follows:

(1) The risk of childhood leukemia (ALL+AML) caused by magnetic field strength in a childhood bedroom does not rise until about 0.4 µT. The risk begins to rise over 0.4 µT. The adjustment odds ratio is 2.63 (95% confidence interval: 0.77-8.96). In the individual analysis case of childhood leukemia (ALL+AML), only the risk of ALL exhibited large increases above 0.4 µT. The adjustment odds ratio is 4.73 (95% confidence interval: 1.14-19.7) and is significant.

(2) The risk of childhood leukemia (ALL+AML) at less than 50 m from a high voltage transmission line is significantly higher than that more than 100 m distant from a high voltage transmission line. Specially, the adjustment odds ratio of childhood leukemia (ALL+AML) based on the reference category, that the distance from a residence to the nearest high voltage transmission line is over than 100 m, are 1.56 (95% confidence interval: 0.87-2.91) at 50 to 100 m distance and 3.29 (95% confidence interval: 1.39-7.54) under 50 m distance.

In only the ALL case, the adjustment odds ratio of childhood leukemia (only ALL) is 1.36 (95% confidence interval: 0.70-2.65) 50 to 100 m distance and 3.69 (95% confidence interval: 1.47-9.21) under 50 m distance. These data suggests that the risk increases near high voltage transmission lines.

There is no consistent evidence that exposure to ELF fields experienced in the daily living environment causes direct damage to biological molecules, including DNA. Since it seems unlikely that ELF fields could initiate cancers, a large number of studies have been conducted to determine if ELF exposure can influence cancer promotion or co-promotion. Results from animal studies conducted so far suggest that ELF fields do not initiate or promote cancer. In 1998, a working group examining the issue for the US National Institute of Environmental Health Sciences (NIEHS) concluded that the scientific evidence of the risk to health humans by ELF magnetic fields is weak. In animal studies in Japan, the phenomenon of childhood leukemia due to ELF magnetic field exposure has not been observed. It is therefore believed that other factors will turn out to be the cause of the childhood leukemia.

The inventor's tests calculated the influence by the electromotive forces of 0.4 µT ELF magnetic fields using electromagnetic theory. The inventor founded that the electromotive forces of 0.4 µT are too weak to break DNA chains that were discovered by molecular biology. The inventor also founded that the joule heat generated by 0.4 µT ELF magnetic fields is too small to influence the living body. Furthermore, there are many electrical home apparatus that generate ELF magnetic fields of more than 0.4 µT.

When these facts were discussed at a symposium, a medical doctor stated incredulously:

"The magnetic field produced by a high voltage transmission line is different to the magnetic field produced by an electrical home appliance. Don't you know that?"

The theory stated by the medical doctor is not explained by present-day physics (electromagnetic theory, quantum mechanics, and elementary particle theory) and physical chemistry. So, the inventor decided to investigate the reference field. After the investigation, the inventor discovered the following.

(1) The corona discharge occurring around transmission lines causes the emission of ultraviolet light. The corona discharge changes from glow corona to brush corona to streaming corona as the voltage in the transmission line is increased. When the glow corona occurred, the emission of ultraviolet light was observed. However during the day, this is not observable due to the brightness of sunlight.

The collision of an electron and a nitrogen molecule causes a band of the nitrogen molecule to be excited at a wavelength of 202.3 nm excitation potential, or the nitrogen molecule becomes an ionized nitrogen molecule of ionization of wavelength of 80 nm ionization potential. Therefore, by the Frank-Condon principle, slightly longer wavelengths of ultraviolet light are emitted from the ionized or excited nitrogen molecules. If the kinetic energy of an accelerated electron is larger, the nitrogen molecule is excited to higher energy levels. Therefore, shorter wavelengths of ultraviolet light are emitted.

(2) According to the document 11, the wavelengths of 315 nm, 337 nm, 357 nm, 391 nm, and 427 nm in the ultraviolet are emitted in glow corona discharge, and wavelengths of 315 nm, 337 nm, and 357 nm ultraviolet are emitted in stream corona discharge. In the document 12, wavelengths of 82.6 nm to 124.2 nm ultraviolet are reported.

(3) Ozone, NO gas, and $NO_2$ gas are generated during corona discharge. According to the document 13, wavelengths of 230 nm and 240 nm ultraviolet are emitted by NO gas. Nitrogen molecules and oxygen molecules are excited or ionized during corona discharge. If these ionized molecules collide with a transmission line, radio noise is generated. The voltage of beginning of corona discharge is much influenced by the weather, the scratches on the transmission lines of transmission lines and dew condensation of transmission lines.

(4) In the past, the radio or television noise generated by corona discharge and the acoustic noise generated by corona discharge were studied. The corona loss that is generated higher voltage than that of glow corona discharge is also studied well. However, the fact that ultraviolet light is emitted at the level of glow corona discharge has not been studied.

(5) Corona discharge continued for a long time because the maxim voltage of an electric field decreases when the corona discharge begins. Therefore, a human near the corona discharge has a high probability to be exposed for a long time to the ultraviolet light generated by the corona discharge.

In the Fact Sheet No. 205 of the WHO, there is a description about noise, ozone and corona. However, I suppose that the discussion of noise, ozone and corona was completed without the knowledge that corona discharge generates ultraviolet light. In the document, "Both the noise levels and ozone concentrations around power lines have no health consequence" is only reported. The ultraviolet light generated by the corona discharge was not mentioned. If there was no discussion of this matter, discussion should be resumed about the ultraviolet light generated by the corona discharge.

The high voltage transmission lines generate extremely low frequency electric and magnetic fields and also generate harmful ultraviolet light when corona discharge begins.

There was a rumor that ultraviolet light was regarded good for health for a period, and was not subject to much notice. Lately the effects on human health by ultraviolet light have been examined more seriously. The effect on the skin, eyes and the immune system has been noted.

Children are at especially high risk of suffering damage from exposure to ultraviolet radiation. Fact Sheet N-261 was published on July 2001 by the WHO. However, the exposure limit to ultraviolet radiation was not indicated by the WHO.

According to the theory of quantum mechanics, an electromagnetic wave of wavelength $\lambda$ has energy of $hc/\lambda$ where h is Planck's constant and c is the speed of light. According to document No. 17, since the wavelength of ultraviolet light is very short, ultraviolet light has very high energies and can damage the DNA in living things.

Ultraviolet light is divided into UV-A (400 nm to 315 nm), UV-B (315 nm to 280 nm), and UV-C (280 nm to 100 nm) in the order from the longest wavelength.

The ultraviolet light of solar radiation is progressively filtered as sunlight passes through the atmosphere, in particular by ozone and oxygen molecules. Therefore, on the Earth's surface we can only to observe UV-A and weakened UV-B. Consequently, the report about the influence of ultraviolet light to human health is in ordinary discussed about UV-A and UV-B that reach the Earth's surface. It is reported that UV-B is harmful and damages DNA and weakens immune equation. UV-C is used for sterilization. It is extremely dangerous to expose the human body to UV-C radiation. As mentioned above, the ultraviolet light generated from .corona discharge contains UV-B and UV-C. The UV-B is absorbed by ozone and the UV-C is absorbed by ozone and oxygen molecules. The UV-B extends far. from the corona discharge generating area, because ozone density is low outside of the corona discharge generated area. The UV-C is greatly absorbed by oxygen molecules that are common at the Earth's surface. However, the UV-C extends up to 200 m to 300 m from the corona discharge generated area.

Therefore, the residences nearer to the corona discharge generated from transmission lines seriously suffered from exposure to ultraviolet light (particularly UV-B and UV-C) generated from corona discharge, because corona discharge sometimes continues for a long time.

From the molecular biology perspective, the DNA of the human body is damaged by UV-B and UV-C. However, the damaged DNA is normally repaired by several repair systems in the human body.

The repair systems in children are sometimes not effective. If children are exposed on UV-B and UV-C for a long time, it may be beyond the repair limit.

In addition, ultraviolet light influences the immune system of the human body. The mechanism by which ultraviolet light decreases the immune system is considered to be as follows.

In the epidermis of the skin, there are many Langerhans cells having the shape of a spread palm. The Langerhans cell obtains the information that a foreign object has entered the human body, then moves to a lymph node and transmits the information to lymphocytes for the lymph node dealing with the foreign object.

If the Langerhans cells are destroyed by ultraviolet light, it is difficult to obtain the foreign object invasion information. The lymphocytes can not receive the information, and the immune system cannot equate.

According to the above research, the corona discharge generates ultraviolet light even at the glow corona level. The ultraviolet light contains UV-B and UV-C that are harmful to the human body. If humans are living near high voltage transmission lines, the same symptoms as exposure to harmful ultraviolet light are expected. UV radiation is classified as probably carcinogenic to humans (usually based on strong evidence of carcinogenicity in animals) in WHO Fact Sheet NO. 263.

According to the above facts, I believe that the risk of childhood leukemia near high voltage transmission lines, which is admitted by the epidemiologic research, is mainly caused by harmful ultraviolet light generated by corona discharge.

Therefore, it is necessary to stop corona discharge, even at the glow corona level, by decreasing the transmission voltage rapidly. It is also important to maintain the trust that electric power is safe and convenient. The trust is established by long term efforts by electrical engineers.

I cannot find documents regarding suppressing corona discharge for stopping ultraviolet light generation. The following several documents about suppressing corona discharge for the prevention of damaging power apparatuses, prevention of broadcasting noise, and reducing corona power loss:

Patent document 1: Japanese Unexamined Patent Application Publication No. H11-038078;

Patent document 2: Japanese Unexamined Patent Application Publication No. H10-038957;

Non-Patent Document 1: Japan Electrical Engineering Handbook Sixth Edition, pages 485 to 486, 1005 to 1023, and 1225 to 1226;

Non-Patent Document 2: Japan Electrical Engineering, Ionized Gas Discussion, pages 28 to 51, and 103 to 114;

Non-Patent Document 3: World Health Organization (WHO) Fact Sheet No. 263, Electromagnetic fields and public health: extremely low frequency fields and cancer;

Non-Patent Document 4: World Health Organization (WHO) Fact sheet No. 205, Electromagnetic fields and public health: extremely low frequency (ELF);

Non-Patent Document 5: World Health Organization (WHO.) Fact sheet No. 261, Protecting Children from Ultraviolet Radiation; pg,14

Non-Patent Document 6: The National Institute for Environmental Studies (NIES), Epidemiologic study on childhood cancers in Japan (1999-2002), by Dr. Michinori Kabuto;

Non-Patent Document 7: Central Research Institute of Electric Power Industry, CRIEPI Review, No. 47 page 56;

Non-Patent Document 8: Central Research Institute of Electric Power Industry, A Study on Audible Noise from AC and DC Transmission Lines, by M. Fukushima;

Non-Patent Document 9: Central Research Institute of Electric Power Industry, Corona Effects of UHY AC Overhead Transmission Lines, by T. Sasano, S. Tomita, K. Tanabe, Y. Deguchi, and H. Harada;

Non-Patent Document 10: Maruzen Ltd., Molecular Biology, by Seiichi Tanuma, page 81

Non-Patent Document 11: Muroran Institute of Technology, Decomposition Characteristics of Benzene in Flue Gas by Corona Discharge Plasma, by Kohki Satoh, Nobuyuki Yoshizawa, Hidenori Itoh, Hiroaki Tagashima, and Mitsue Shimozuma;

Non-Patent Document 12: Tables of Vacuum Ultraviolet Emission Bands of Molecular Nitrogen from 82.6 to 124.2 nm, by J-Y. Roncin and F. Launay, A&A Supplement series, Vol. 128, Mar. 1, 1998, pages 361 to 362;

Non-Patent Document 13: Texas Instruments, Use of Spectrograph-based OLS for SiN Etch Selectivity and Endpoint Optimization, by F. G. Celii and C. Huffrnan, et al.;

Non-Patent Document 14: Health Guidance Manual against Ultraviolet Light, Japan Ministry of The Environment home page;

Non-Patent Document 15: DHC Shuttpan, Children, Skin and Sun, by Ichihashi Masamitsu;

Non-Patent Document 16: http://www.intl-light.com Light Measurement Handbook, by Alex Ryer;

Non-Patent Document 17: Oxford University Press, PHYSICAL CHEMISTRY Sixth Edition, by P. W. Atkins.

DISCLOSURE OF THE INVENTION

Objects of the Invention

An object of the invention is to provide the electric power system stably supplying electric power while suppressing corona discharge that generates ultraviolet light which is harmful to the human body (for example, the cause of childhood leukemia). The corona discharge start voltage varies with the weather, the level of scratches when the transmission lines were wired, and the level of weathering of wires. Therefore, it is not economical to set a low transmission voltage for the whole system to stop the corona discharge, because the transmission capacity is extremely limited.

It is also not practical to detect corona discharge over the entirely of the power transmission lines that is wired over extremely long distances. It is desirable to suppress corona discharge practically, economically, and effectively.

SUMMARY OF THE INVENTION

In this invention, the data which are related to the beginning of corona discharge on each transmission line are recorded in a memory means in advance. Data on weather forecasts is inputted for each district at predetermined time intervals so as to calculate the estimated corona discharge start voltage for each transmission line with a computer. If the calculated corona discharge beginning voltage of a transmission line is lower than the normal transmission voltage of the line, the countermeasures of the transmission voltage that are recorded in the memory means in advance are selected to set transmission voltage of the transmission line. The calculation of the estimated corona discharge start voltage and selecting of set transmission voltage are executed on all transmission lines in the electric power system. The set transmission voltage data are inputted to a power system analysis means. The power system analysis means analyze the load of the apparatuses of the power system. According to the analysis result, specific countermeasures are adopted by the apparatuses of the power system. Therefore, an electric power system for stably supplying power while suppressing corona discharge is achieved.

Another method of this invention for solving the problem is to install a corona discharge detecting means and a sending means which sends the detected data, on transmission lines near places where people reside. If the means detects corona discharge, the sending means sends the detected data to a power system analysis means. The power system analysis means analyze the load of the apparatuses of the power system under the conditions that the transmission voltage of the detected line is lowered, or the transmission through the detected transmission line stopped. According to the analysis result, the specific countermeasures are adopted to the apparatuses of the power system. Therefore, an electric power system for stably supplying power while stopping the generation of ultraviolet radiation, which is harmful to humans, on short time is achieved.

By this invention, the corona discharge that continues for a long time and generates harmful ultraviolet light is suppressed for power transmission lines.

BRIEF DESCRIPTION OF THE DRAWINGS

FIG. 3 is an example of weather forecast data.

FIG. 4 is an example of data on transmission lines.

FIG. 5 is an example of data of transmission voltage set for transmission lines.

PREFERRED MODE FOR CARRYING OUT THE INVENTION

Figure 1:
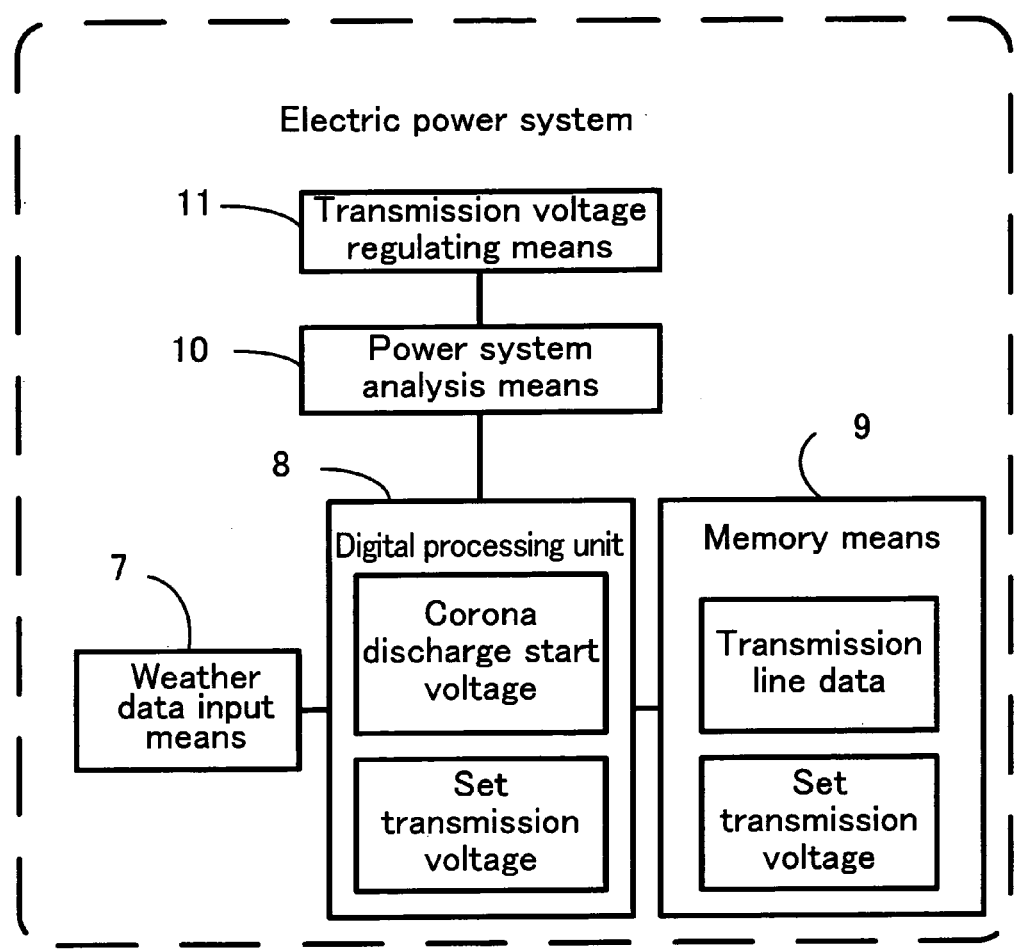
FIG. 1 is a block diagram of a preferred mode for carrying out this invention.

An electric power system comprises a weather data input means which inputs weather data, for example temperature, atmospheric pressure and weather, etc., at the district of each operating transmission line, memory means which stores each transmission line data and processed data by digital processing unit, digital processing unit which calculates corona discharge start voltage of each transmission lines and decides set transmission voltage of the transmission line, adjust apparatuses which adjusts each line transmission voltage to the set transmission voltage, and a power system analysis means.

Data on weather forecasts is inputted for each district at predetermined time intervals. The digital processing unit calculates the estimated corona discharge start voltage for each transmission line by the data in weather forecasts. If the calculated corona discharge start voltage of a transmission line is lower than the normal transmission voltage of the line, the countermeasures transmission voltage that is recorded in memory means in advance is selected to set transmission voltage of the transmission line. If the calculated corona discharge start voltage of a transmission line is above the normal transmission voltage of the line, the normal transmission voltage is selected to set the transmission voltage of the transmission line.

The power system analysis means analyze the load of the apparatuses of the power system. According to the analysis result, specific countermeasures are adopted to the apparatuses of the power system. Therefore, the electric power system can stably supply electric power economically and effectively while suppressing corona discharge.

An electronic computer comprises weather data input means which inputs weather data, for example temperature, atmospheric pressure and weather, etc., at the district of each operating transmission lines, memory means which stores each transmission line data, digital processing unit which calculates corona discharge start voltage of each transmission line, deciding means which sets transmission voltage of the transmission line, and output means which outputs each line's set transmission voltage.

In the computer, the computer program product comprises data on weather forecasts being inputted step, calculating the estimated corona discharge start voltage for each transmission line by the data on weather forecasts step, if the calculated corona discharge start voltage of a transmission line is lower than the normal transmission voltage of the line, the countermeasures transmission voltage that is recorded in memory means in advance being selected to set transmission voltage of the transmission line step, if the calculated corona discharge start voltage of a transmission line is above the normal transmission voltage of the line, the normal transmission voltage being selected to set transmission voltage of the transmission line step, outputting or sending the set transmission voltage of all transmission lines step.

By adopting the set transmission voltage of all transmission lines that do not generate corona discharge, the total automated operating system of electric power can stably supply electric power economically and effectively while suppressing corona discharge.

In an electric power system, a corona discharge detecting means are installed on transmission lines near places where people reside, and a sending means sends the detected data to a power system analysis means. If the detecting means detects corona discharge, the transmission voltage is lowered, or the transmission through the transmission line is stopped.

In the electric power system, recalculation of transmission route is performed for stably supplying power.

The corona discharge detecting means comprises a device that detects ultraviolet level electromagnetic waves. The corona discharge detecting means is set so as to receive the ultraviolet light that is generated by corona discharge on the target transmission line. In this case, the corona discharge detecting means has to perform detection during the day. Therefore, the ultraviolet light that is generated by corona discharge has to be distinguished from that from the Sun. A Solar-Bind Vacuum Photodiode is desirable as the device.

FIRST EMBODIMENT

Figure 2:
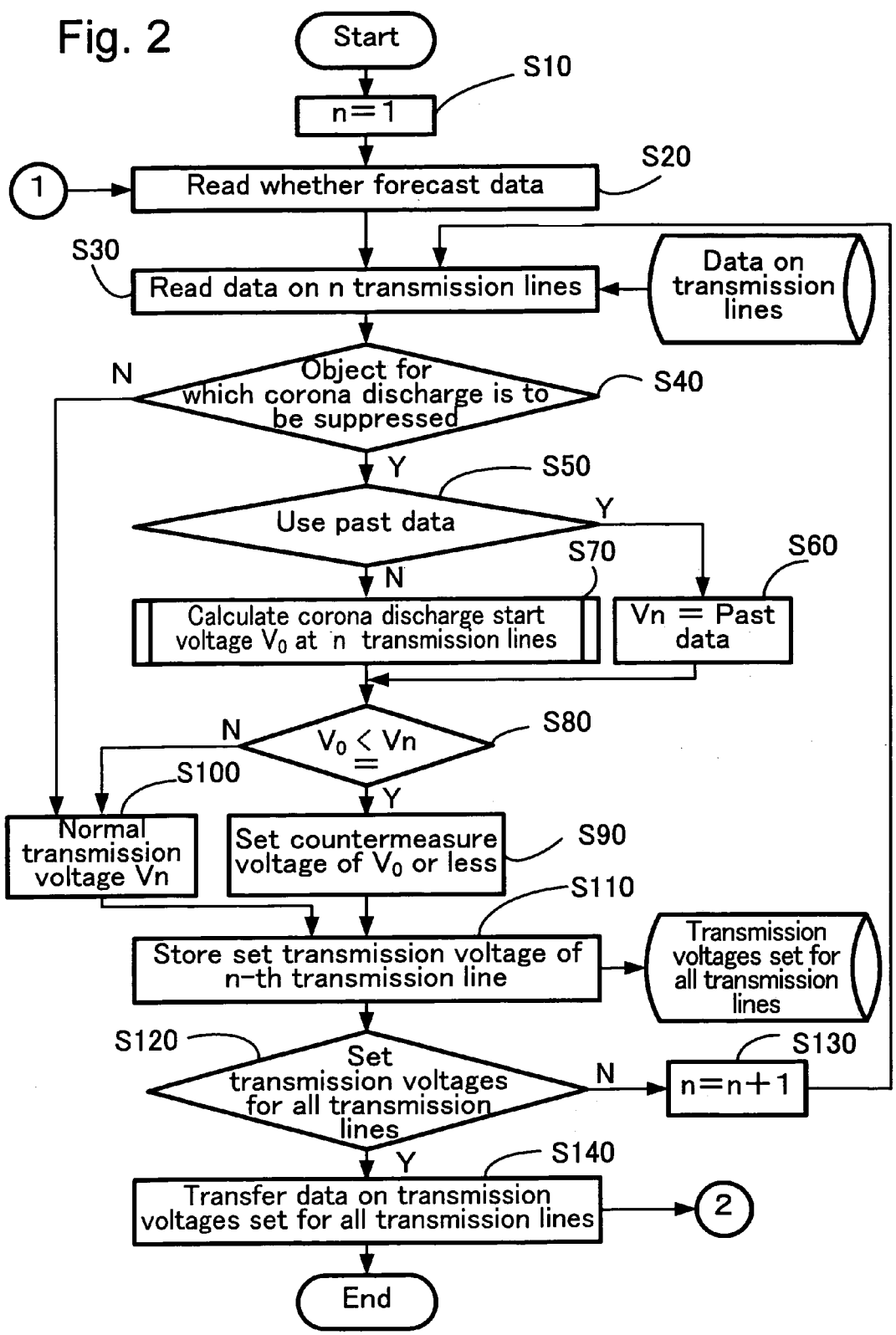
FIG. 2 is a process flow chart of a digital processing unit in this invention.

FIG. 1 is block diagram of a preferred mode for carrying out this invention. FIG. 2 is the process flow chart of digital processing unit in this invention. FIG. 3 is an example of weather forecast data. FIG. 4 shows an example of data on transmission lines. FIG. 5 is an example of data of transmission voltage set for transmission lines.

Figure 8:
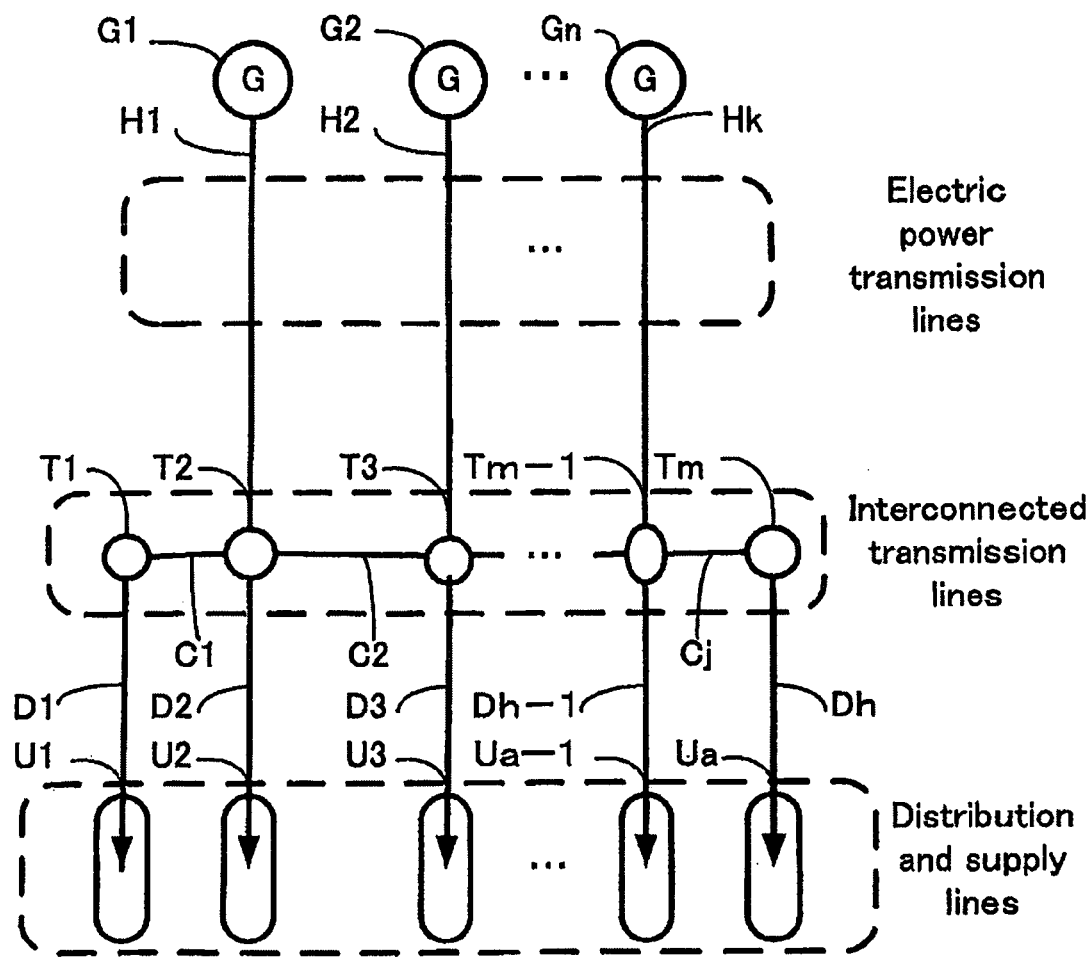
FIG. 8 is a basic diagram of a large electric power system.

In the embodiment of FIG. 1, weather data input means 7, digital processing unit 8 and memory means 9 are added to the basic structure of large electric power system shown in FIG. 8. Moreover, power system analysis means 10 and transmission voltage regulating means 11 are need to be changed as much as to operate by the set transmission voltage that is after described below.

The weather data input means 7 is the means that inputs weather forecast data as shown in FIG. 3 to digital processing unit 8, and it is possible to realize this by connecting a commercial modem (for example, NEC Aterm IT21L) to a personal computer.

The digital processing unit 8 is the device that processes the FIG. 2 flow chart process, and it is possible to realize this by personal computer which has more than an 8 bit central processing unit. The digital processing unit 8 may also realize this by a digital signal processor.

The memory means 9 is a means that stores each transmission line data and processed data by digital processing unit 8. The memory means may be realized by a hard disk drive, semiconductor memory, etc. The memory means may use personal a computer internal memory.

According to FIG. 2, the processing details of the digital processing unit 8 are explained. When the software of the digital processing unit 8 starts, the digital processing unit 8 sets n to 1 at first (S10). Next, the digital processing unit 8 inputs weather forecast data by the weather data input means. The weather forecast data are temperature, atmospheric pressure and weather of the set district of each transmission lines are desirably input every 2 hours. Thereafter, the data of first recorded transmission line 21 is read from the memory means 9 (S30). The example data of each transmission line are shown in FIG. 4. The contents of the data of each transmission line are Object for which corona discharge is to be suppressed or not, Use past data, Normal transmission voltage, area where set up, Surface coefficient of wire m0 and coefficient k that is decided by the design of transmission line, and Countermeasures voltage. These data are pre-recorded in memory means 9. The reason for setting the data of the object for which corona discharge is to be suppressed or not is that some transmission lines are laid in nonresidential areas and is not a problem to human health. The reason for setting the data of Using past data or not is that in the case of actual corona discharge observation executed, the actual data and that conditions should be recorded. Some transmission lines are so long that the area where set up, are more than two areas.

It is decided that the transmission line is the object for which corona discharge is to be suppressed or not (S40). If the transmission line is not the object, the normal transmission voltage that has been recorded is set for transmission voltage (S100). If the transmission line is the object, it is decided by the digital processing unit 8 using read data whether the past data should be used or not. If the past data should be used, the past data recorded in memory means is used for corona discharge start voltage (S60).

If the past data cannot be used, the corona discharge start voltage $V_0$ of the transmission line is calculated by substituting the weather forecasts data and the transmission data for an equation. The equation is desirably the following equation 1 and equation 2. Here, m1 is a weather coefficient that is now 1.0 on a fine day and is 0.8 on a rain, snowy day, or a foggy day. It is desirable to decide more accurately one according to actual data collection, $m_0$: surface coefficient of wire, k: the coefficient decided by structure, r: radius of the element wire of transmission wire (cm), b: atmospheric pressure (hPa), t: temperature (C).

$$V_o = 1.178\, m_0 km_1 \delta^{2/3}(1+0.301/\sqrt{r\delta}) \quad \text{[Equation 1]}$$

$$\delta = 0.290 b/(273+t) \quad \text{[Equation 2]}$$

The corona discharge start voltage $V_0$ is compared with the normal transmission voltage Vn (S80). If the normal transmission voltage Vn is equivalent or lower than the corona discharge start voltage $V_0$, pre-stored countermeasures voltage is set for set transmission voltage (S90). On other cases, the normal transmission voltage Vn is set for set transmission voltage (S100). Then, the set transmission voltage of the first transmission line is recorded to memory means 9 (S110). Then, it is checked if all transmission lines have been set or not (S120). If all transmission lines have not been set, 1 is added to n (S130), and next transmission line data is read (S30). In this way, one after another transmission voltages of the transmission lines are set. If the set transmission voltage of all transmission lines (object are the transmission lines that the phase voltage is more than 22 kV, is anticipated to generate corona discharge) have been set, these data are sent to the power system analysis means 10.

The power system analysis means 10 decides the load of the apparatuses of the power system in the condition of the set transmission voltage of all transmission lines. According to the analysis result, the load of each apparatuses of the power system is ordered to these apparatuses. The voltage of the transmission lines are adjusted by the transmission voltage regulating means 11. Therefore, the corona discharge generation on the transmission lines is suppressed in advance. Another advantage is that the electric power system can stably supply because analysis of stable power supply is made in advance.

SECOND EMBODIMENT

Another embodiment of this invention is computer program which comprises weather data input means, memory means, digital processing unit and output means and has the same function of FIG. 2. In this embodiment, the all transmission line's set transmission voltages which are calculated using the computer program are entered to an electric power system.

Then, it is possible to obtain the same effect as the first embodiment. It is also possible to obtain the same effect as the first embodiment by supplying the computer readable memory device which stores the computer program, on the server which stores the computer program, to an electric power supply company.

THIRD EMBODIMENT

Figure 6:
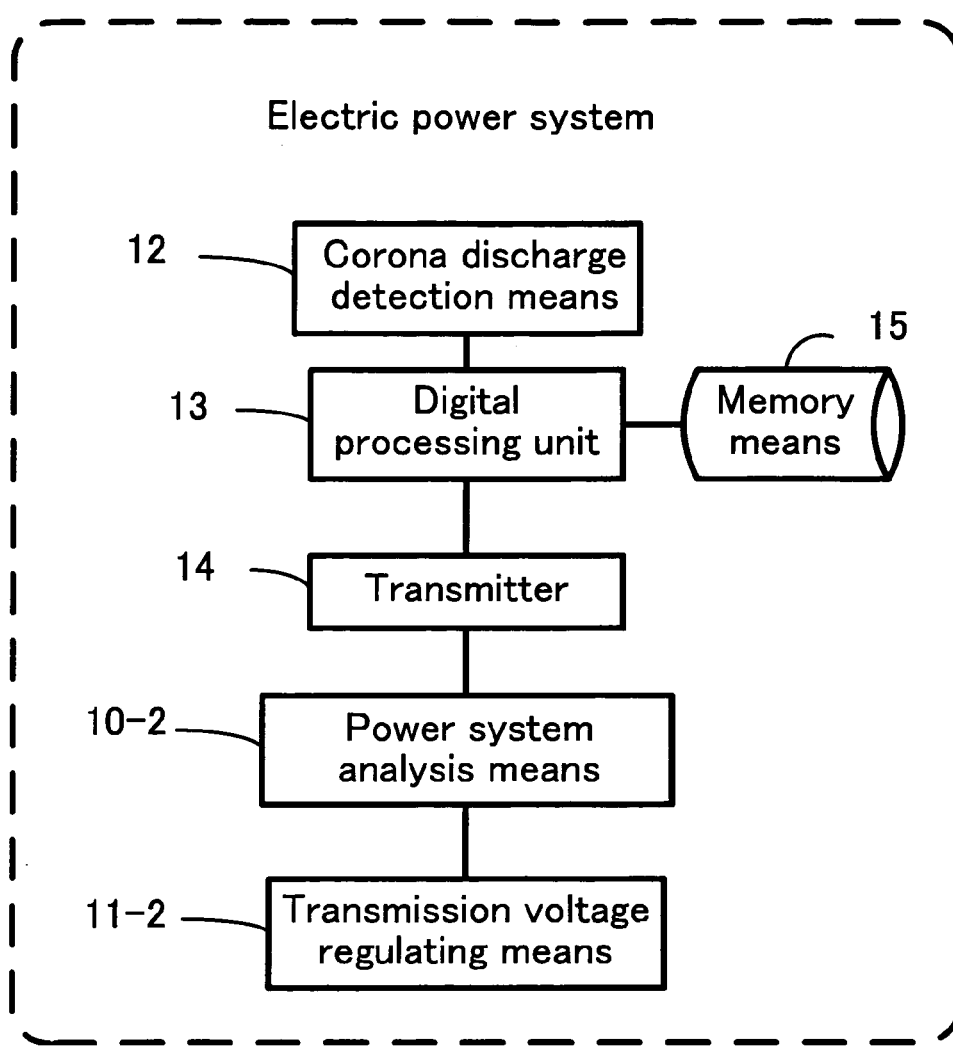
FIG. 6 is a block diagram of example 3 for carrying out this invention.

FIG. 6 is a block diagram of example 3 for carrying out this invention. In this embodiment, corona discharge detect means 12, digital processing unit 13 and transmitter 14 are added to the basic structure of large electric power system shown in FIG. 8. In addition, it is necessary to improve the performance of power system analysis means 10-2 and transmission voltage regulating means 11-2 in the basic structure, as explained hereinafter.

The corona discharge detect means 12 is the means for detecting the occurrence of corona discharge at a transmission line. The corona discharge detect means 12 is most desirable in that the ultraviolet light detecting device which is installed near places where people reside has minimal effect conventional electric power systems.

A Solar-Blind Vacuum Photodiode is most desirable as the ultraviolet light detecting device at the present time. However a semiconductor photo-diode, a phototube, a photoconductive sensor, a photovoltaic sensor, etc. may be used as the ultraviolet light detecting device. A special filter to distinguish the ultraviolet light from the sun may be used to intercept the ultraviolet light from the sun, so as to detect only the ultraviolet light generated by corona discharge.

The corona discharge detect means 12 more detects effectively whether or not corona discharge occurring that is harmful to humans, by detecting wavelengths of 100 nm to 320 nm (UV-C, UV-B) which are especially harmful to humans. The corona discharge detect means 12 may also be to realized by a device for detecting corona noise or a device for detecting a corona sounds.

Digital processing unit 13 converts information detected by the corona discharge detect means 12 into information which is needed by a superior power system analysis means 10-2. The digital processing unit 13 may be realized by a circuit that uses a generally available micro-computer and associated software. The transmitter 14 transmits information converted by the digital processing unit 13 to the power system analysis means 10-2. The transmitter 14 may be realized by wired or wireless means, or by other equivalent means.

When the occurrence of corona discharge at a transmission line that is being surveyed is detected by the corona discharge detect means 12, the fact that the corona discharge has occurred is converted into information needed by the power system analysis means 10-2. The converted information is transmitted to the power system analysis means 10-2 by the transmitter 14.

The power system analysis means 10-2 analyzes other conditions necessary for the power system based on the transmitted information, determines the load on each device, and issues orders to each device. The transmission voltage regulating means 11-2 also receives orders as part of this issuing of orders ordering. The transmission voltage regulating means 11-2 lowers the transmission voltage of the corona discharge detected transmission line according to the orders. Another method is to stop transmission in the transmission line in which the corona discharge is detected. As a result transmission voltage of the transmission line decreases, and the corona discharge stops. If the corona discharge does not stop, the information from corona discharge detection means 12 and the information which has been stored in memory means 15 are again transmitted to the power system analysis means 10-2.

The power system analysis means 10-2 analyzes based on re-transmitted information the power system and determines the load on each apparatuses, and issues order to apparatuses.

The transmission voltage regulating means 11-2 further decreases the transmission voltage of the corona discharge detected transmission line according to the orders.

As a result the transmission voltage of the corona discharge detected transmission line further decreases, and the corona discharge stops.

Therefore, the corona discharge on the detected transmission line is stopped in a short time. Another advantage is that the electric power system can stably provide power supply because the analysis of the power system is made before decreasing the transmission voltages.

However, it is uneconomical to adopt lowered transmission voltages even if the condition has changed so that corona discharge is not generated. An easy method for solving of this problem consists of returning to the previous transmission voltages at the predetermined time (roughly when weather changes) after decreasing the transmission voltages. If the corona discharge is not generated with the previous transmission voltages, the previous transmission voltages are maintained. If the corona discharge is generated with the previous transmission voltages, the same step as in the corona discharge generation mentioned above is adopted.

Figure 7:
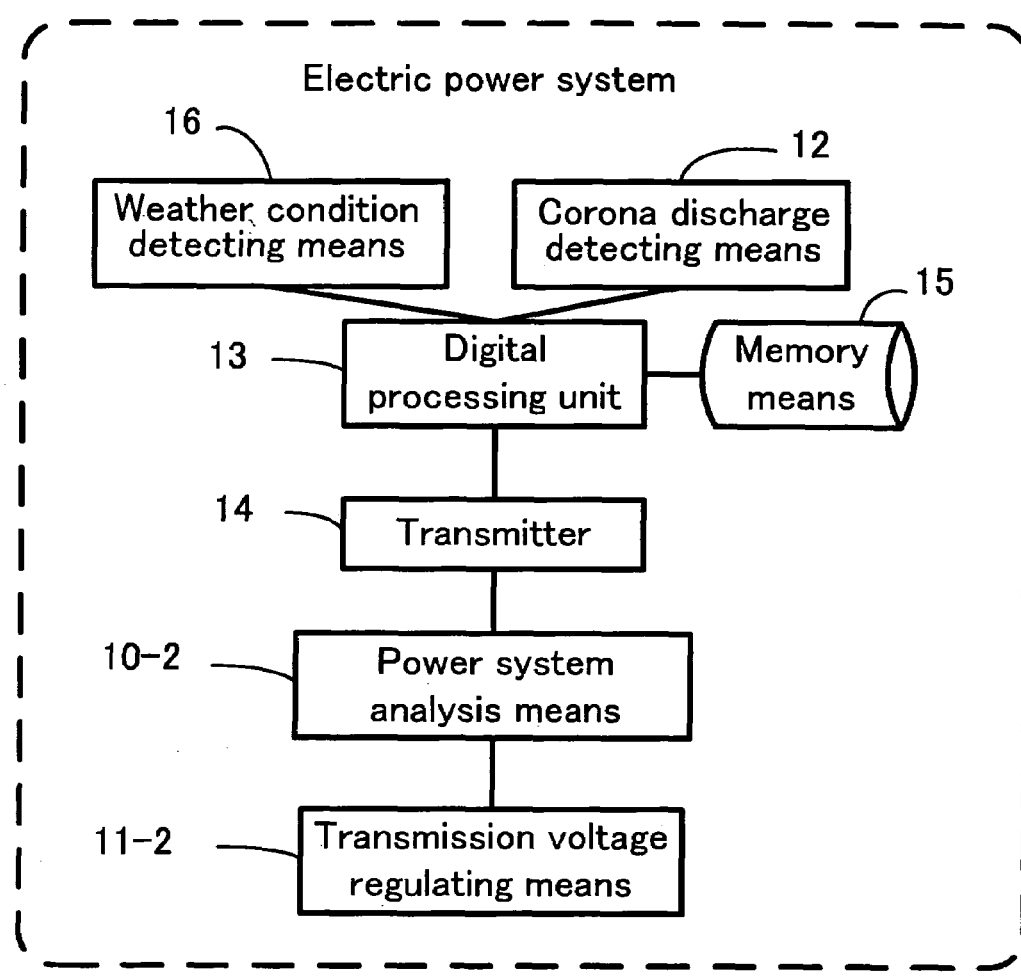
FIG. 7 is a block diagram of another example for carrying out this invention.

FIG. 7 is a block diagram of another example for carrying out this invention.

A weather detecting means 16 is added to the construction of FIG. 6. The weather detecting means 16 is a means for detecting the weather conditions that affect the corona discharge generation voltages, for example temperature, pressure, humidity, etc. The means to send the information which the weather detecting means 16 gets to the digital processing unit 13 is also contained in the weather detecting means 16. The detection of temperature, pressure, humidity, etc., are realized by selecting for each a proper device from the prior art.

When the corona discharge detecting means 12 detects the corona discharge, the weather detecting means 16 detects the weather conditions. The information detected by the weather detecting means 16 is converted by the digital processing unit 13. The converted information is then stored in memory means 15.

After the corona discharge is stopped by the step mentioned above, the transmission voltage is changed to the previous one, the weather conditions which are newly detected by the weather detecting means 16 are different from the stored weather conditions and are assumed not to generate corona discharges.

In addition, the conditions data which the corona discharge generates for each transmission line are stored in memory means 15. The stored data may be used as past data in the first embodiment of this invention.

While the invention has been described with reference to exemplary embodiments, it will be understood by those skilled in the art that various changes may be made and equivalents may be substituted for elements thereof without departing from the scope of the invention.

For example, the electric power system is described as being large scale. This invention is adaptable to smaller scale electric power systems. In a system, partly human operations are possible for this invention.

In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

The invention claimed is:

1. An electric power system comprising:
a weather data input means for inputting weather data, temperature, atmospheric pressure and weather, at predetermined time intervals, in a district of operating transmission lines; a digital processing unit;
a memory means for storing transmission line data that shows relations between a corona discharge start voltage and weather conditions at each transmission line, and processed data by said digital processing unit;
and a power system analysis means, wherein said digital processing unit calculates the corona discharge start voltage at said each transmission line based on weather forecast data and said transmission line data, if the calculated corona discharge start voltage is lower than a normal transmission voltage of the transmission line, a countermeasure transmission voltage that is recorded in said memory means in advance is selected to set a transmission voltage of the transmission line or stop transmitting electric power on the transmission line, and if the calculated corona discharge start voltage is above the normal transmission voltage of the transmission line, the normal transmission voltage is selected as the set transmission voltage of the transmission line, and wherein said power system analysis means analyzes loads of apparatuses of the power system.

2. The electric power system as claimed in claim 1, wherein the calculation of the corona discharge start voltage by said digital processing unit is executed as follows:
(1) the transmission line is an object for which a corona discharge is to be suppressed,
(2) said digital processing unit reads data to determine whether past data should be used or not, and if the past data should be used, the past data recorded in said memory means is used for the corona discharge start voltage, and
(3) if the past data cannot be used, the corona discharge start voltage at the transmission line is calculated by substituting the weather forecast data and the transmission data in an equation.

3. An electric power system comprising:
a corona discharge detection means for detecting the occurrence of corona discharge at a transmission line;
a digital processing unit wherein said digital processing unit converts information detected by the corona discharge detection means into information which is needed by a superior power system analysis means;
and a transmitter wherein said transmitter transmits said converted information to the superior power system analysis means,
wherein said digital processing unit stops a corona discharge in a short time by lowering a transmission voltage of a transmission line that generates the corona discharge, or stops transmitting electric power in the transmission line when said corona discharge detection means detects a corona discharge, and wherein said power system analysis means adjusts loads of apparatuses in the electric power system, wherein said digital processing unit stores weather conditions in said memory means before and after occurrence of a corona discharge, and changes the transmission voltage to a voltage level before detecting corona discharge, when weather conditions are assumed not to generate a corona discharge.

4. The electric power system as claimed in claim 3, wherein said corona discharge detection means is an ultraviolet light detecting device.

5. The electric power system as claimed in claim 3, wherein said corona discharge detection means is an ultraviolet light detecting device that detects ultraviolet light of a wavelength 100 nm to 320 nm.

6. The electric power system as claimed in claim 3, wherein said digital processing unit restores the previous transmission voltage on a predetermined time after lowering the transmission voltages.

7. A method for operating electric power system suppressing corona discharge from viewpoint of environment, the method comprising:
inputting weather data, temperature, atmospheric pressure and weather at predetermined time intervals in a district of operating transmission lines;
calculating a corona discharge start voltage at each transmission line based on weather forecast data and the transmission line data,
if the calculated corona discharge start voltage is lower than a normal transmission voltage of the transmission line, a countermeasure transmission voltage that is recorded in the memory means in advance is selected to set a transmission voltage of the transmission line, and
if the calculated corona discharge start voltage is above the normal transmission voltage of the transmission line, the normal transmission voltage is selected as the set transmission voltage of the transmission line, and
storing transmission line data and processed data in memory means by a digital processing unit; and
analyzing loads of apparatuses of the power system by a power system analysis means.

8. The electric power system operating method as claimed in claim 7,
wherein the calculating the corona discharge start voltage includes:
(1) judging whether or not the transmission line is an object for which a corona discharge is to be suppressed,
(2) deciding whether past data should be used or not, and if the past data should be used, the past data recorded in said memory means is used for the corona discharge start voltage, and
(3) calculating the corona discharge start voltage at the transmission line by substituting the weather forecast data and the transmission data in an equation, if the past data cannot be used.

9. An electric power system operating method comprising:
detecting a corona discharge on a transmission line;
stopping the corona discharge in a short time by lowering a transmission voltage of a transmission line that generates the corona discharge, or stopping transmitting electric power in the transmission line;
adjusting loads of apparatuses in the electric power system;
operating the apparatuses under an adjusted condition for supplying electric power, storing weather conditions in a memory means before and after occurrence of a corona discharge; and changing the transmission voltage to a voltage level before detecting the corona discharge, when weather conditions are assumed not to generate a corona discharge.

* * * * *